(12) United States Patent
Germerodt et al.

(10) Patent No.: US 6,579,216 B2
(45) Date of Patent: Jun. 17, 2003

(54) TOOL EXCHANGING APPARATUS FOR A PROCESSING CENTER

(75) Inventors: Frank Germerodt, Uhlstadt (DE); Thorsten Lasch, Aspach (DE); Eberhard Stenzel, Gera (DE)

(73) Assignee: Deckel Maho Seebach GmbH, Seebach (DE)

( * ) Notice: Subject to any disclaimer, the term of this patent is extended or adjusted under 35 U.S.C. 154(b) by 0 days.

(21) Appl. No.: 09/755,091

(22) Filed: Jan. 8, 2001

(65) Prior Publication Data
US 2001/0023222 A1 Sep. 20, 2001

Related U.S. Application Data

(63) Continuation of application No. PCT/EP99/03534, filed on May 22, 1999.

(30) Foreign Application Priority Data

Jul. 8, 1998 (DE) .......................................... 198 30 392

(51) Int. Cl.$^7$ .............................................. B23Q 3/157
(52) U.S. Cl. .......................... 483/51; 483/55; 483/56; 483/57; 483/60; 483/68
(58) Field of Search ........................... 483/901, 55, 59, 483/13, 7, 57, 58, 56, 53, 51, 60, 68; 901/41

(56) References Cited

U.S. PATENT DOCUMENTS

| | | | | |
|---|---|---|---|---|
| 3,298,098 A | * | 1/1967 | Gleisner, Jr. ................. | 483/57 |
| 3,932,924 A | * | 1/1976 | Anderson ..................... | 483/68 |
| 4,185,376 A | * | 1/1980 | Johnstone .................... | 483/13 |
| 4,221,043 A | * | 9/1980 | Dailey ......................... | 483/68 |
| 4,571,813 A | * | 2/1986 | Fukuoka et al. ............... | 483/68 |
| 4,683,638 A | * | 8/1987 | Winkler et al. ................ | 483/66 |
| 5,281,194 A | * | 1/1994 | Schneider .................... | 483/901 |
| 2002/0115541 A1 | * | 8/2002 | Patel et al. ..................... | 483/1 |

FOREIGN PATENT DOCUMENTS

| | | | |
|---|---|---|---|
| DE | 3501113 A1 | | 7/1986 |
| DE | 3701858 A1 | | 1/1991 |
| DE | 4009537 A1 | * | 10/1991 |
| EP | 0342257 A1 | | 11/1989 |
| EP | WO 00/02703 | * | 1/2000 |
| FR | 2465557 A1 | * | 4/1981 |
| JP | 3010736 A | | 1/1991 |
| JP | 9-248731 A | * | 9/1997 |

* cited by examiner

*Primary Examiner*—A. L. Wellington
*Assistant Examiner*—Erica E Cadugan
(74) *Attorney, Agent, or Firm*—Connolly Bove Lodge & Hutz

(57) ABSTRACT

A tool exchanging apparatus for a processing center, provided with at least one tool spindle (2), in which a tool (1) can be clamped and which can be moved in the direction of the spindle axis and at least also in a direction vertical to this direction, equipped with a tool magazine (3) and with two tool holding devices (4a) on a transporting device (4) with which the tool holding device (4a) can be moved to a tool exchanging position located in the movement region of the tool spindle (2), wherein one used tool (1) can be deposited from the tool spindle (2) and a new tool can be removed from the tool spindle (2). Each of the tool holding devices (4a), which are provided at least in pairs, is allocated to its own transporting device (4) so that the transporting devices can be moved back and forth independently of each other between the tool exchanging position and a tool receptacle (3a) of the tool magazine (3). The tool receptacles (3a) of the tool magazine (3) are movable in a circulating manner.

14 Claims, 4 Drawing Sheets

TOOL EXCHANGING APPARATUS FOR A PROCESSING CENTER

CROSS REFERENCE TO RELATED APPLICATION

This is continuing application of PCT/EP99/03534, filed May 22, 1999, which designated the U.S.

FIELD OF THE INVENTION

The invention relates to a tool exchanging apparatus for a processing center.

BACKGROUND OF THE INVENTION

A known tool exchanging apparatus of this type (DE 40 09 537 C2) is provided with a tool exchange stand, which is movable in the linear direction between a magazine delivery position and a spindle delivery position. The tool-exchanging stand carries a gripping equipment provided with two gripping devices which can be rotated around an axis to move them between the horizontal and the vertical position. In the spindle delivery position, the used tool is delivered from the tool spindle of the processing machine to one of the gripping devices and a new tool is removed from the second gripping device. In addition to the pivot drive for the gripping devices and the transport drive for the tool exchanging stand, the tool exchanging apparatus also requires a driving mechanism for opening and closing of the gripping devices. Such a large number of driving mechanisms means that this apparatus is expensive. The tools of this known apparatus must be switched between the magazine and the tool-exchanging stand by means of another independently manipulated device. The transport of the tool including the preparation in the magazine, the delivery to the manipulating device, and a further delivery to the exchange stand and transport to the spindle delivery position which includes also rotation of the gripping devices requires so much time that this time period will exceed the time period during which the tool is used when the processing center is operated at a high speed. The utilization level of the processing machine is thus adversely affected because the machine must wait for the next tool.

Also, a sheet metal processing machine provided with a tool magazine is known (from DE 37 01 858 A1), which enables tool-receiving operations. The tools are inserted from the tool magazine with a delivering mechanism in a transporting mechanism and removed again from this transporting mechanism after the tools have been used. The transporting mechanism transports the tool from a mounting position to the processing position. As soon as the processing is finished, the used tool is moved from the processing position to a removing position, while a new tool, which is supplied in advance from the magazine to the transporting mechanism, travels to the processing position. A similar construction is suitable only for machines deployed in stationary processing positions. Moreover, a similar apparatus does not permit a particularly quick access to a plurality of different tools when all of these tools need to be exchanged quickly.

Also known is a tool exchanging apparatus provided with two tool spindles (JP 03 010736 A), according to which each tool spindles is always assigned only to one tool holding device.

Each tool holding device must be equipped with an additional delivery device, which is constructed as a rocking lever and which must be also emptied. The delivery devices constructed as rocking levers remove the tools from the circulating tool magazine and they deposit the tools into the circulating tool magazine.

This known tool exchanging apparatus can be only used if it is equipped with two tool spindles. An economical exchange of tools thus cannot be achieved with the help of this apparatus since one of the tool spindles will always remain unused.

SUMMARY OF THE INVENTION

Based on the status of technology, the objective if this invention is to create a simple tool exchanging apparatus which makes it possible to realize the shortest possible tool transporting time even when there is a great number of tool locations.

The solution or this task is accomplished in accordance with the embodiments discussed below.

According to one embodiment, simple movements will occur between the preparing position for a new tool or the receiving position for a used tool of the tool magazine and the tool changing position, movements that can take places independently of each other, both with respect to the used tool and with respect to the new tool. The replacement of the tools saves time as it occurs when the tools are in neighboring positions, and the exchange is conducted in an inexpensive manner by using for this purpose the movements of the machine without causing waiting time periods by the movements of the magazine.

Preferred embodiments of the invention will become clear from the subordinated claims.

BRIEF DESCRIPTION OF THE DRAWINGS

The following is a detailed explanation of a preferred embodiment form of the invention based on the enclosed figures. The figures show.

DETAILED DESCRIPTION OF THE INVENTION

Figure 1:
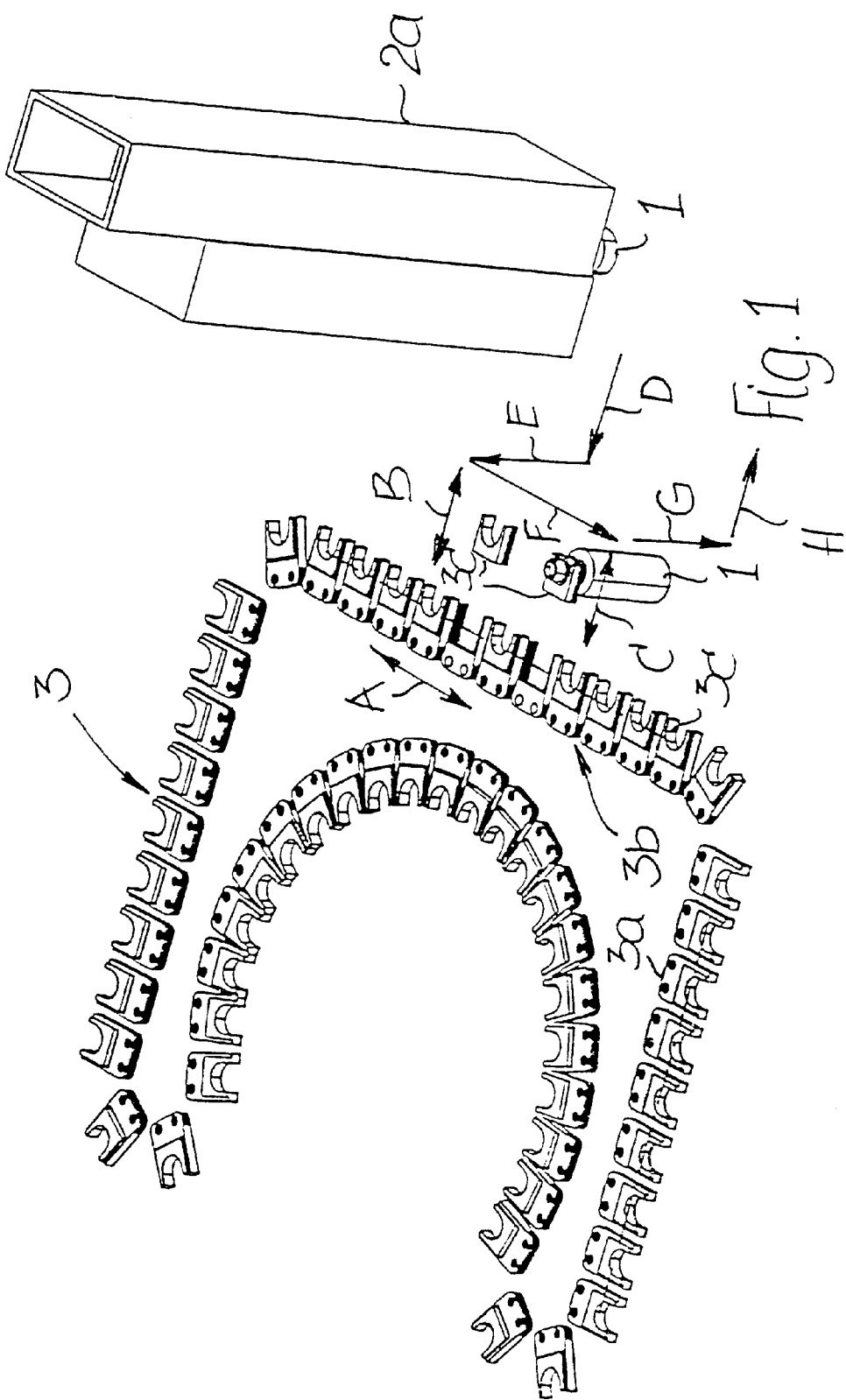
FIG. 1—a perspective, schematic view of a tool exchanging apparatus showing a schematic representation of the movement cycle.
Figure 2:
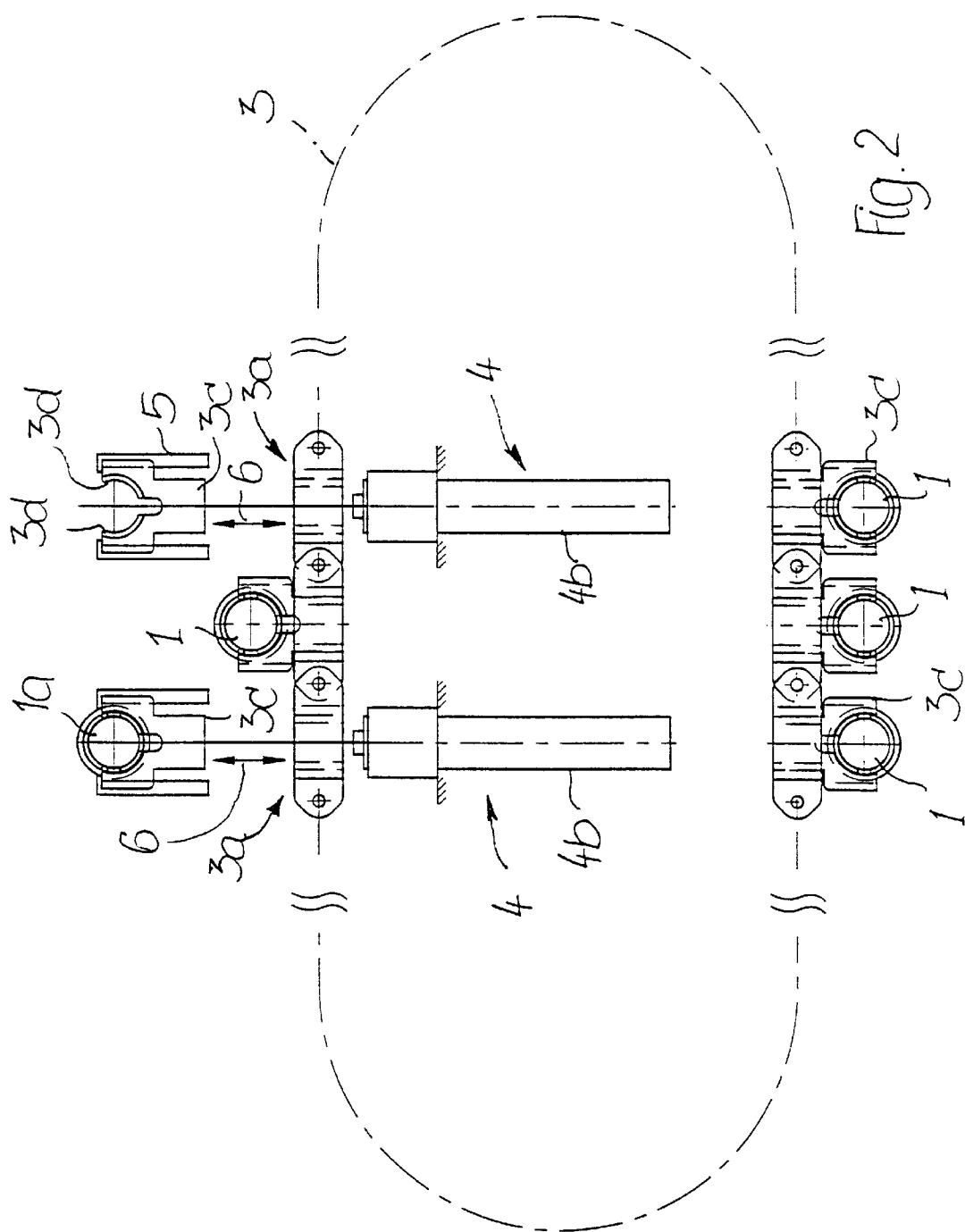
FIG. 2—a perspective top view of a part of the transporting apparatus of the tool exchanging apparatus according to FIG. 1 shown here in a simplified form.

The tool exchanging apparatus is provided with tool magazine 3 and transporting device 4. The tool magazine 3 is equipped with a closed chain of tool receptacles 3a, which are circulated by a drive, not shown in the figure. In these tool receptacles 3a of the tool magazine 3 are held guiding plates 3c, which are equipped with tools 1. FIG. 1 shows only one row of tool receptacles 3a, which are constructed as cassettes and which form in the neighboring region of one of the tool spindles 2 a straight circulation region 3b.

The chain is stopped by the drive when a selected tool receptacle 3a is located between the guides 5 which create the tool exchanging position and the tool transporting apparatuses 4. The piston-cylinder units 4b are coupled to guiding plates 3c of this selected tool receptacle 3a. After that, the guiding plates 3c can be inserted in the direction indicated by double arrow 6 by the piston-cylinder units 4b into guides 5 or withdrawn from them. Only one of the two guiding plates 3c, which are located in the tool exchanging position, is designated for insertion of the tool, which is located on tool spindle 2, while the other one carries the next tool 1, which will be provided for the next processing operation. Both guiding plates 3c, in tool receptacles 3a, and tools 1, in guiding plates 3c, can be secured by spring catches, not shown in the figure.

Figure 3:
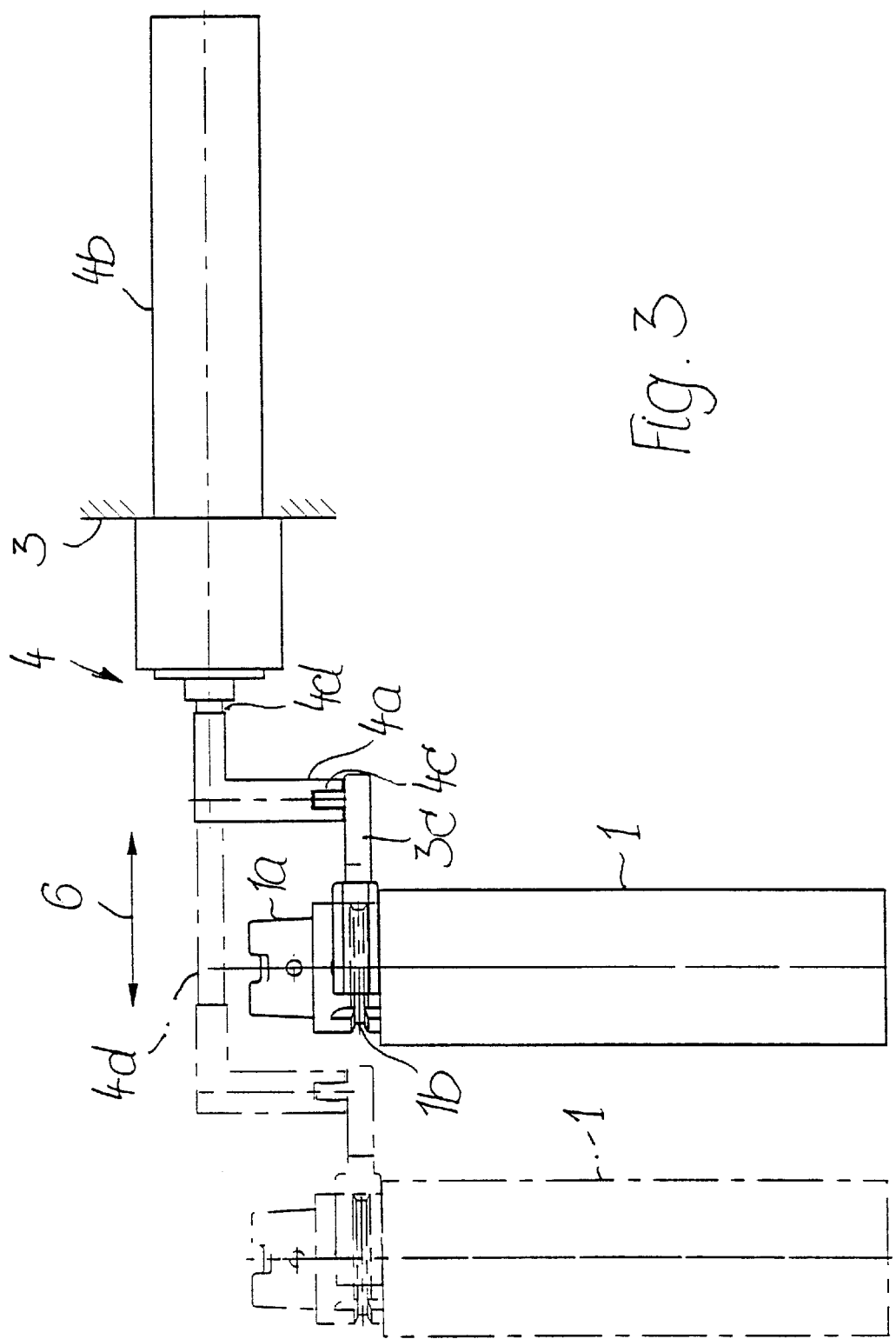
FIG. 3—a schematic side view of a transporting apparatus of the tool exchanging apparatus according to FIG. 2.

The piston-cylinder units 4b attached in a fixed location of the region of the tool magazine 3 of the tool transporting apparatus 4 are connected with piston rod 4d to one of the tool holding devices 4a, which are depicted in FIG. 3, which supports on its opposite end a coupling element 4c. The coupling element 4c forms a separable connection to guiding plate 3c. In the guiding plate 3c, is stored a tool 1, indicated here only schematically, which is equipped with a taper shaft 1a provided for reception of the tool in one of the tool spindles 2. Next to the taper shaft 1a is provided tool 1, equipped with a wedge-shaped ring groove 1b in which is engaged bridge 3d of the guiding plate 3c, formed in the shape of a truncated cone. The position of the tool 1, which is shown by the dotted line in FIG. 3, indicates the tool exchanging position in the tool transporting apparatus 4. As one can see from the representation indicated in the figure, tool magazine 3 can circulate unobstructed when piston rod 4d is in the extended status.

Figure 4:
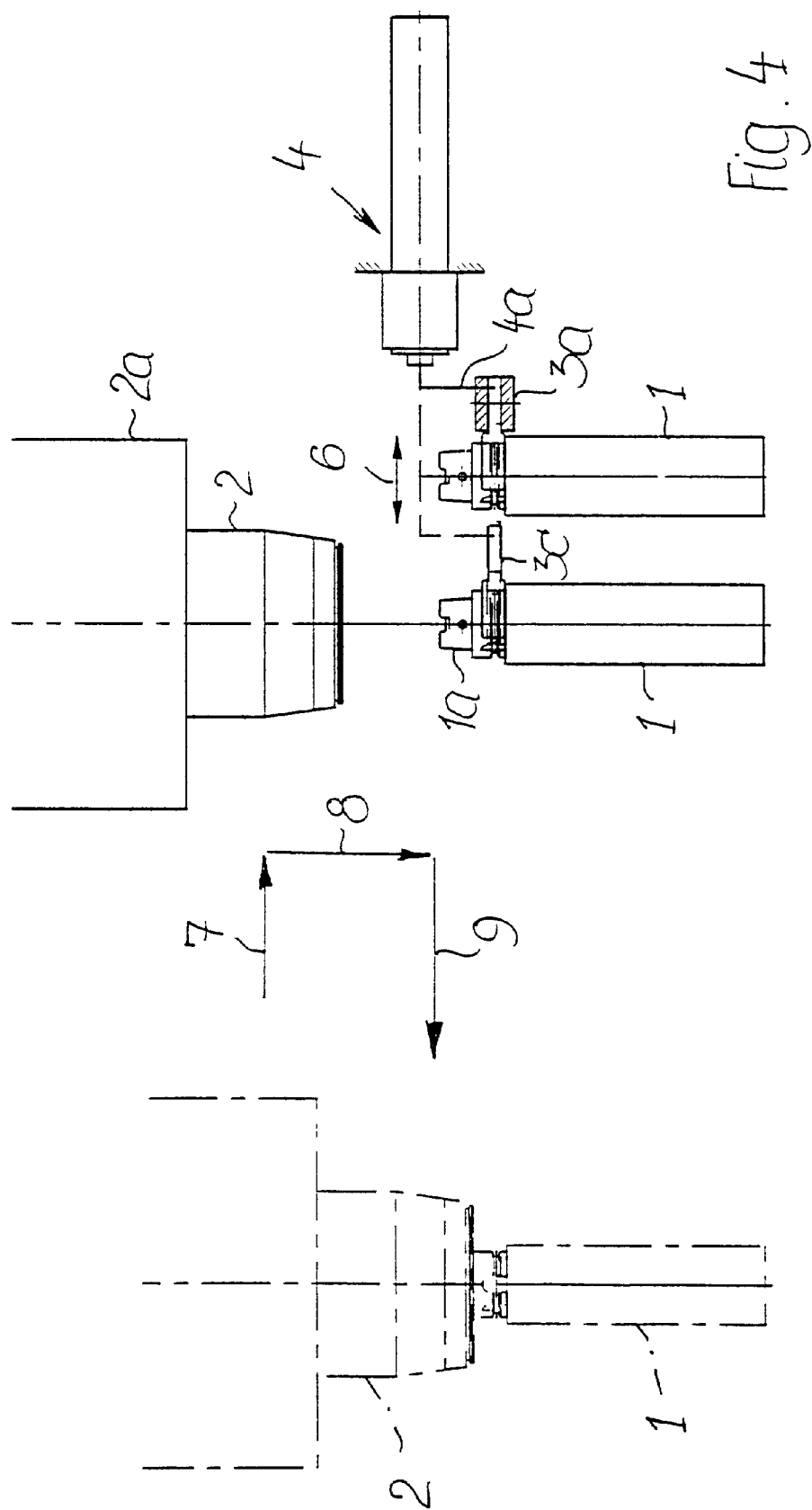
FIG. 4—a schematic side view of the transporting apparatus according to FIG. 3, which includes a cross-sectional view of the tool magazine and an illustration showing the tool spindle in the tool-exchanging position.

FIG. 4 shows the delivery operation wherein a new tool 1 is delivered to tool spindle 2 of a processing center of which only the spindle case 2a is indicated. The fully extended left tool 1 is located in the delivery position. The right tool is held in one of the tool receptacles 3a of the magazine 3. The tool spindle 2 proceeds in the direction indicated by arrow 7 until the rotational axis of spindle 2 becomes aligned with the axis of the short of taper shaft holder 1a. Due to a lowering of spindle 3 in the direction indicated by arrow 8, short taper shaft holder 1a will be inserted into the cone shaped hole of the tool spindle 2 and it will be clamped in it. During a backward movement of the tool spindle 2 in the direction indicated by arrow 9 to the position indicated by the dotted line, the tool 1 is released from the guiding plate 3 because it is now held only by a spring catch.

The entire movement cycle of the tool exchanging operation is clearly illustrated in FIG. 1 by arrows. The cassettes can be moved in the direction of arrow A. Two guiding plates 3c are ready in the standby position for a tool exchange, while one tool 1 will be loaded only on one of these plates. They can be moved in the direction indicated by arrows B and C between the tool exchanging position and each of the tool receptacles 3a. After the end of the processing operations performed with one of the tools 1 held in one of the tool spindles 2, the spindle case 2a will be conveyed in the direction of arrow D, at which point the tool 1 will be mounted into the empty guiding plate 3c. The movement of the tool 2 in the direction indicated by arrow E will release a used tool from the tool spindle 2. The tool spindle 2 will be conveyed in the direction of arrow F until it passes the new tool 1 which is now made ready for use. Due to the lowering (arrow G) of the tool spindle 2, the new tool 1, as was already mentioned in description of FIG. 4, will be taken over by tool spindle 2. Arrow H symbolizes the removal of the tool 1 from the guiding plate 3c and the return of the spindle to the next processing procedure. The deposited tool 1 will be guided back by the movement of guiding plate 3c as shown by arrow B into the tool magazine 3. The cycle of the tool magazine 3 can now be synchronized with the next tool 1 in this removal position. The guiding plate 3c which is now free of the tool 1 will remain in this position in order to receive tool 1 which is now located in the position for application. The tool spindle 2 must therefore first be moved along to this guiding plate 3c for the next tool exchange.

What is claimed is:

1. A tool exchanging apparatus for a processing center, the apparatus comprising
    at least one tool spindle (2), in which a tool (1) can be clamped and in which the tool is transportable in the direction of an axis of the at least one tool spindle and at least in a direction perpendicular to the tool spindle axis,
    wherein the tool exchanging apparatus is provided with a tool magazine (3) and with two tool holding devices (4a) in transporting devices (4) which can be used to transport the tool holding devices (4a) to a tool exchanging position located in a movement region of the at least one tool spindle (2), wherein one used tool (1) can be deposited one of the tool holding devices by the movement of the at least one tool spindle (2) and another, new tool (1) can be removed from one of the tool holding devices by movement of the at least one tool spindle (2);
    characterized by the fact that each of the tool holding devices (4a) is deployed on a corresponding one of the transporting devices (4), and wherein the transporting devices (4) are capable of movement back and forth independently of each other between the tool exchanging position and tool receptacles (3a) of the tool magazine (3), and wherein the tool receptacles (3a) of the tool magazine (3) contain tools and are movable in a circulating manner, and further comprising means for guiding the tools (4) between the tool exchanging position and the tool magazine.

2. The tool exchanging apparatus according to claim 1, characterized by the fact that each transporting device (4) is capable of back and forth movements between the tool exchanging position and the receptacles (3a) of the tool magazine (3).

3. The tool exchanging apparatus according to claim 1, characterized by the fact that each transporting device (4) alternates depositing of a new tool (1) with reception of a used tool (1).

4. The tool exchanging apparatus according to claim 1, characterized by the fact that each tool receptacle (3a) of the tool magazine (3) is provided with a tool cassette which holds a tool (1).

5. The tool exchanging apparatus according to claim 4, wherein a guiding plate (3c) is supported in each tool cassette so that the guiding plate is movable.

6. The tool exchanging apparatus according to claim 5, characterized by the fact that each transporting device (4) is driven by a piston-cylinder unit (4b) which can be coupled with the guiding plate (3c) of a tool (1) which is located in the exchanging position.

7. The tool exchanging apparatus according to claim 5, characterized by the fact that the guiding plates (3c) are supported in the tool exchanging position in guides (5).

8. The tool exchanging apparatus according to claim 1, characterized by the fact that at least one tool holding device (4a) is allocated to each transporting device (4).

9. The tool exchanging apparatus according to claim 1, characterized by the fact that the tool magazine (3) is designed as a chain magazine comprised of the tool receptacles (3a).

10. The tool exchanging apparatus according to claim 1, characterized by the fact that the tool receptacles (3a) of the tool magazine (3) can be connected according to a sequence.

11. The tool exchanging apparatus according to claim 1, characterized by the fact that the tool receptacles (3a) are mounted rectilinearly in a region adjacent to the at least one tool spindle (2).

12. The tool exchanging apparatus according to claim 1, characterized by the fact that the tool exchanging position is located in the near vicinity of and outside of the magazine.

13. The tool exchanging apparatus according to claim 1, characterized by the fact that the tools (1) contained in the receptacles (3a) of the tool magazine (3) are maintained at least in the vicinity of the tool exchanging position.

14. The tool exchanging device of claim 1, wherein a tool in the tool exchanging apparatus is movable between the tool exchanging position, a position within the tool magazine, and a working position of the at least one tool spindle.

* * * * *